United States Patent [19]

Brookman et al.

[11] Patent Number: 4,840,694

[45] Date of Patent: Jun. 20, 1989

[54] METHODS AND APPARATUS FOR HANDLING DOUBLE-SIDED ADHESIVE TABS

[75] Inventors: Donald L. Brookman; David E. Merrill, both of Richmond; Everett C. Grollimund, Midlothian, all of Va.

[73] Assignee: Philip Morris Incorporated, New York, N.Y.

[21] Appl. No.: 220,665

[22] Filed: Jul. 18, 1988

[51] Int. Cl.[4] .............................................. B32B 31/18

[52] U.S. Cl. .................................. 156/344; 156/157; 156/235; 156/249; 156/361; 156/502; 156/541; 156/584; 242/58.5

[58] Field of Search ............... 156/157, 235, 249, 344, 156/361, 502, 541, 584; 242/58.5

[56] References Cited

U.S. PATENT DOCUMENTS

| | | | |
|---|---|---|---|
| 3,415,705 | 12/1968 | Ettre | 156/540 |
| 4,180,181 | 12/1979 | Brandwein | 156/584 X |
| 4,282,056 | 8/1981 | Okui | 156/584 X |
| 4,310,379 | 1/1982 | Harrison | 156/541 |
| 4,502,910 | 3/1985 | Voltmer et al. | 156/361 |
| 4,659,414 | 4/1987 | Heitmann et al. | 156/584 X |
| 4,732,642 | 3/1988 | Ametani | 156/344 X |

*Primary Examiner*—Robert A. Dawson
*Attorney, Agent, or Firm*—Robert R. Jackson

[57] ABSTRACT

Double-sided adhesive tabs are removed from a carrier tape by passing the carrier tape around a convex nose to peel the carrier tape away from each tab. A tab inserter arm contacts the tab prior to peeling away of the carrier tape. The tab inserter arm then moves with and supports the tab during and after peeling away of the carrier tape.

5 Claims, 1 Drawing Sheet

METHODS AND APPARATUS FOR HANDLING DOUBLE-SIDED ADHESIVE TABS

BACKGROUND OF THE INVENTION

This invention relates to methods and apparatus for handling double-sided adhesive tabs, and more particularly to methods and apparatus for removing double-sided adhesive tabs from a carrier tape and for feeding the removed tabs to other apparatus.

Double-sided adhesive tabs typically comprise a web or web-like substrate of paper, plastic film, metal foil, or the like having an adhesive coating on both of its major surfaces or sides. The tab may have any shape (e.g., square, rectangular, circular, etc.) and may be of any size. Such tabs have many uses. For example, in the manufacture of cigarettes a tab of this kind may be used to connect the tail end of one cigarette paper supply web to the starting end of another cigarette paper supply web so that the cigarette-making machine can operate without interruption when the first supply web is exhausted.

Double-sided adhesive tabs are extremely difficult to handle because they are adhesive on both sides. Typically they must be kept completely separate from one another because they cannot be easily separated once they come into contact with one another. Thus one common way in which they are supplied is by releasably adhesively securing them in a spaced arrangement on one side of a longitudinal carrier tape. In order to allow the carrier tape to be supplied in a roll, the other side of the tape is made so that the tabs do not significantly adhere to it. Tabs are used by peeling them from the carrier tape (e.g., by hand) and applying them when and where needed.

Such manual handling of the tabs is undesirable for several reasons such as high cost, low reliability, possible product contamination, etc.

In view of the foregoing, it is an object of this invention to provide improved methods and apparatus for handling double-sided adhesive tabs.

It is a more particular object of the invention to provide methods and apparatus for removing double-sided adhesive tabs from a carrier tape, and for feeding the removed tabs to other apparatus.

SUMMARY OF THE INVENTION

These and other objects of the invention are accomplished in accordance with the principles of the invention by feeding a carrier tape having double-sided adhesive tabs releasably adhesively secured to one of its sides around the convex nose of a first member. The tabs are on the side of the carrier tape which is convex as it passes around the nose. Accordingly, the carrier tape tends to peel away from the adjacent tab as it passes around the nose. As each tab approaches the nose, a second member is pressed against the side of the tab remote from the carrier tape to cause the tab to become adhesively secured to the second member. Thereafter, the second member moves in synchronization with the portion of the carrier tape approaching the nose so that as the carrier tape is peeled away from the tab, the second member continues to support the tab and conveys it to other tab-utilizing apparatus.

Further features of the invention, its nature and various advantages will be more apparent from the accompanying drawings and the following detailed description of the invention.

DETAILED DESCRIPTION OF THE PREFERRED EMBODIMENTS

Figure 1:
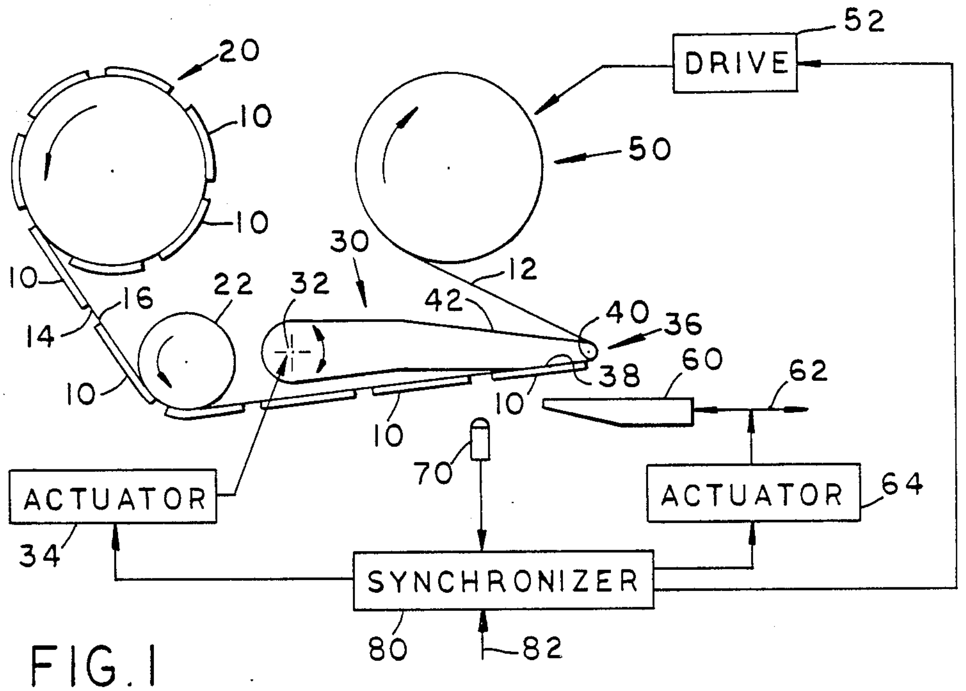
FIG. 1 is a simplified, partly schematic view of illustrative apparatus constructed in accordance with the principles of this invention.

As shown in FIG. 1, double-sided adhesive tabs 10 are disposed in a linear array on one side 14 of longitudinal carrier tape 12. Tabs 10 are releasably adhesively secured to that side of the carrier tape. The opposite side 16 of carrier tape 12 is made so that tabs 10 do not significantly adhere to that side. This makes it possible to supply carrier tape 12 and tabs 10 from a supply roll 20 as shown in FIG. 1.

Carrier tape 12 is drawn from supply roll 20 as needed by passing it over idler roller 22 and peel arm 30 to selectively driven take-up roll 50. The rotation of take-up roll 50 is controlled by drive 52 (e.g., an electric motor, a pawl and ratchet drive, etc., which may be of conventional construction). Tabs 10 are on the convex outward side of carrier tape 12 as it passes over elements 22 and 30.

Peel arm 30 is selectively pivotable about axis 32 near its upstream end. The pivoting of peel arm 30 is produced by actuator 34 (e.g., a mechanical, electrical, hydraulic, pneumatic, etc., actuator which may be of conventional construction). At the end remote from axis 32, peel arm 30 has a convex nose structure 36 about which carrier tape 12 is deflected sufficiently sharply to cause the carrier tape to tend to peel away from the tab 10 adjacent the nose. In particular, nose structure 36 is made up of a first upstream surface 38 and a second downstream surface 42 which is inclined relative to upstream surface 38 and which abuts the upstream surface at a longitudinal edge 40 at the tip of nose structure 36. The longitudinal axis of edge 40 is transverse (preferably perpendicular or at least substantially perpendicular) to the longitudinal axis of carrier tape 12. Upstream surface 38 is preferably flat and substantially parallel to and in contact with the adjacent portion of carrier tape 12.

Below surface 38 is tab inserter arm 60 which is horizontally reciprocable perpendicular to axis 32 as indicated by arrows 62. The reciprocation of tab inserter arm 60 is controlled by actuator 64 e.g., a mechanical, electrical, hydraulic, pneumatic, etc., actuator which may be of conventional construction).

The location of tabs 10 may be sensed by sensor 70 (e.g., a conventional photoelectric sensor) which can optically detect the difference between a tab 10 and the segments of carrier tape 12 which are exposed between adjacent tabs 10. Sensor 70 produces an electrical output signal indicative of whether or not a tab 10 is opposite the sensor. The output signal of sensor 70 is applied to synchronizer 80 to help synchronizer 80 control operation of elements 34, 52, and 64. The apparatus (not shown) which utilizes the tabs may supply another input signal to synchronizer 80 via lead 82 whenever a tab is required by the tab-utilizing apparatus.

Figure 2:
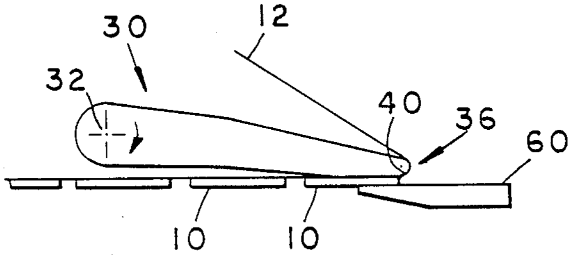
FIG. 2 shows a portion of FIG. 1 at a subsequent stage in the operating cycle of the apparatus.
Figure 3:
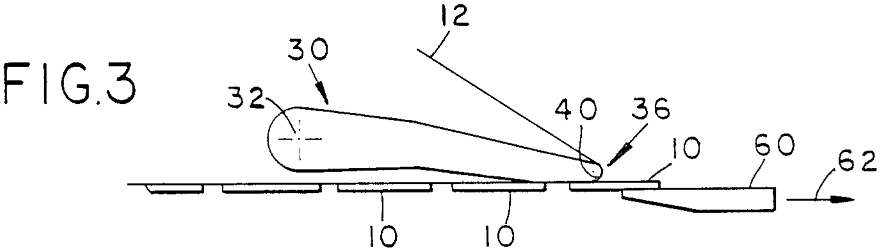
FIG. 3 shows a portion of FIG. 1 at a still later stage in the operating cycle of the apparatus.

Assuming that the apparatus is initially in the condition shown in FIG. 1, when a tab is required, synchronizer 80 causes actuator 34 to pivot peel arm 30 down to the position shown in FIG. 2. This presses the tab 10 closest to nose 36 down against tab inserter arm 60. In particular, the leading portion of the side of that tab which is remote from carrier tape 12 is pressed down against a portion of the upper surface of arm 60. The tab is thereby adhesively secured to arm 60. Thereafter, as shown in FIG. 3, synchronizer 80 causes drive 52 to rotate take-up roll 50 by the amount required to advance carrier tape 12 one tab length (e.g., until sensor 70 again detects a gap between adjacent tabs). At the same time, synchronizer 80 causes actuator 64 to move tab inserter arm 60 to the right at the same rate that the adjacent portion of carrier tape 12 is moving to the right. As carrier tape 12 travels around edge 40, it is peeled away from the tab which is in contact with tab inserter arm 60. However, tab inserter arm 60 now supports this tab and continues to move it to the right. Eventually, the tab in contact with arm 60 is completely free of carrier tape 12. Shortly thereafter, carrier tape 12 stops with another tab 10 in the starting position shown in FIG. 1. Tab inserter arm 60 then delivers the tab supported by it to the tab-utilizing apparatus and returns empty to the starting position shown in FIG. 1. The apparatus is now ready to begin another cycle of operation whenever another tab is required.

Note that the fact that the tab 10 in contact with arm 60 extends from that arm may be used to help the tab-utilizing apparatus remove the tab from arm 60. If that is not required, the tab in contact with arm 60 need not project from that arm.

If desired to simplify the synchronization and drive functions, carrier tape 12 may be pulled along by passing it through the nip between selectively driven pressure rollers located, for example, between nose 36 and take-up roll 50. In that case, drive 52 would drive one or both of these pressure rollers whenever it was desired to advance carrier tape 12, and take-up roll 50 would merely be driven (e.g., frictionally) to take up the slack in the carrier tape exiting from the pressure rollers. This would render the carrier tape drive less sensitive to possible elasticity of carrier tape 12, and also insensitive to the gradual increase in the diameter of the expended carrier tape on take-up roll 50.

We claim:

1. Apparatus for removing double-sided adhesive tabs from a longitudinal carrier tape having opposite first and second sides, each of said tabs having opposite first and second adhesive sides, said first adhesive side of each of said tabs being initially releasably adhesively secured to said first side of said carrier tape so that said tabs are disposed in a longitudinal array substantially parallel to the longitudinal axis of said carrier tape, said apparatus comprising:

a first member having adjacent first and second surfaces, said surfaces being inclined relative to one another and abutting one another at a longitudinal edge, said first and second surfaces collectively forming a surface structure which is convex about said edge;

means for guiding said carrier tape relative to said surface structure so that said longitudinal axis of said carrier tape is transverse to said longitudinal axis of said edge and so that a portion of said second side of said carrier tape contacts said first surface and said edge and is concave about said edge;

first means for selectively producing relative motion of said carrier tape and said first member substantially parallel to said longitudinal axis of said carrier tape and in the direction from said first surface to said second surface, said motion of said carrier tape about said convex surface structure tending to peel said carrier tape away from the adjacent tab as said carrier tape passes said edge;

a second member having a third surface; and second means for selectively producing relative motion of said first and second members such that said third surface (1) contacts said second side of a tab opposite said first surface so that said tab opposite said first surface becomes adhesively secured to said third surface, and (2) thereafter moves substantially parallel to and in synchronization with the portion of said carrier tape which is adjacent to said first surface so that said third surface supports said tab opposite said first surface as said carrier tape is peeled away from that tab during said motion of said carrier tape about said convex surface structure.

2. The apparatus defined in claim 1 wherein said third surface contacts only a portion of said second side of said tab opposite said first surface.

3. The apparatus defined in claim 2 wherein said portion of said second side of said tab contacted by said third surface is the portion closer to said edge.

4. The apparatus defined in claim 1 wherein said longitudinal axis of said carrier tape is substantially perpendicular to said longitudinal axis of said edge.

5. The method of removing double-sided adhesive tabs from the surface of a carrier tape to which said tabs are initially releasably adhesively secured, said method comprising the steps of:

feeding said carrier tape around a convex nose structure so that the tabs are on the side of said carrier tape which becomes convex as said carrier tape passes said nose structure in order to peel the carrier tape from a tab adjacent said nose structure;

contacting said tab adjacent said nose structure with a member, said member contacting the surface of said tab remote from said carrier tape in order to adhesively secure said tab to said member; and moving said member in synchronization with said tab adjacent said nose structure in order to support said tab after said carrier tape has been completely peeled away from said tab.

* * * * *